US008843755B2

(12) United States Patent
Heiner et al.

(10) Patent No.: US 8,843,755 B2
(45) Date of Patent: Sep. 23, 2014

(54) USER AUTHENTICATION

(75) Inventors: Andreas Petrus Heiner, Espoo (FI); Paul Michael Dunphy, New Farnley Leeds (GB)

(73) Assignee: Nokia Corporation, Espoo (FI)

( * ) Notice: Subject to any disclaimer, the term of this patent is extended or adjusted under 35 U.S.C. 154(b) by 730 days.

(21) Appl. No.: 12/644,840

(22) Filed: Dec. 22, 2009

(65) Prior Publication Data
US 2011/0154482 A1    Jun. 23, 2011

(51) Int. Cl.
    H04L 9/32    (2006.01)
    G06F 21/36    (2013.01)
(52) U.S. Cl.
    CPC ...... H04L 9/32 (2013.01); G06F 21/36 (2013.01); H04L 2209/80 (2013.01)
    USPC ........................................................ 713/183
(58) Field of Classification Search
    USPC ........................................ 713/182, 183, 184
    See application file for complete search history.

(56) References Cited

U.S. PATENT DOCUMENTS

| 7,738,857 | B2 * | 6/2010 | Engstrom et al. | 455/411 |
| 8,117,458 | B2 * | 2/2012 | Osborn et al. | 713/183 |
| 2003/0210127 | A1 * | 11/2003 | Anderson | 340/5.27 |
| 2004/0030934 | A1 * | 2/2004 | Mizoguchi et al. | 713/202 |
| 2004/0093527 | A1 * | 5/2004 | Pering et al. | 713/202 |
| 2004/0260955 | A1 | 12/2004 | Mantyla | |
| 2005/0060554 | A1 * | 3/2005 | O'Donoghue | 713/183 |
| 2008/0320310 | A1 * | 12/2008 | Florencio et al. | 713/184 |

FOREIGN PATENT DOCUMENTS

| CN | 101017524 | 8/2007 |
| CN | 101027699 | 8/2007 |
| WO | WO0233882 A1 | 4/2002 |
| WO | WO2005022473 A1 | 3/2005 |

OTHER PUBLICATIONS

Awase-E: Recognition-based Image Authentication Scheme Using User's Personal Photographs by Tetsuji Takada, Published 2006 by University of Electro-Communication Tokyo Japan pp. 1-5.*
Using Personal Photos as Pictorial Passwords by Thomas S. Tullis and Donna P. Tedesco, Published 2005 ACM Digital Library pp. 1-4.*
Dhamija, R. et al., "Deja Vu: A User Study Using Images for Authentication", in: SSYM'00 Proceedings of the 9th conference on USENIX Security Symposium. Berkeley: USENIX Association, Aug. 2000, 14 pages.
PCT International Search Report dated Feb. 21, 2011 for PCT/FI2010/050840, 4 pages.

(Continued)

Primary Examiner — Ellen Tran
(74) Attorney, Agent, or Firm — Locke Lord LLP

(57) ABSTRACT

An apparatus lets a user to determine a pool of images and then forms from the pool of images a set of images for user authentication and divides the set of images into two mutually exclusive subsets: a key image subset comprising images referred to as key images and a decoy image subset comprising images referred to as decoy images. The apparatus displays the key images to the user to teach the key images to the user. Then, to authenticate the user, the apparatus produces an assortment of decoy images and key images, and displays the assortment to the user. The apparatus receives from the user identification of images held as key images and verifies whether the identification of key images matched with the key images selected by the processor.

20 Claims, 3 Drawing Sheets

(56) References Cited

OTHER PUBLICATIONS

PCT Written Opinion of the International Searching Authority dated Feb. 21, 2011 for PCT/FI2010/050840, 7 pages.

Takada, T., et al., "Awase-E: Recognition-based Image Authentication Scheme Using User's Personal Photographs", 2006, 5 pages.

Dhamija, R., et al., "Déjà Vu: A User Study Using Images for Authentication", SIMS / CS, University of California Berkeley, Sep. 5, 2000, 14 pages.

Suo, X., et al., "Graphical Passwords: A Survey", Department of Computer Science, Georgia State University, Sep. 17, 2005, 10 pages.

De Angeli, A., et al., "Is a picture really worth a thousand words? Exploring the feasibility of graphical authentication systems", Advanced Technology & Research, NCR Financial Solutions Group Ltd and Department of Computing Science—University of Glasgow, Oct. 13, 2008, 34 pages.

Jansen, W., et al., "Picture Password: A Visual Login Technique for Mobile Devices", National Institute of Standards and Technology, Technology Administration, U.S. Department of Commerce, NISTIR 7030, Jul. 2003, 20 pages.

"The Science Behind Passfaces", Passfaces™—Strong Authentication, www.passfaces.com, Jun. 23, 2006, 5 pages.

Hayashi, E., et al., "Use Your Illusion: Secure Authentication Usable Anywhere", Symposium on Usable Privacy and Security (SOUPS) 2008, Jul. 23-25, 2008, Pittsburgh, PA USA, 11 pages.

Chen, L. et al, "Study on Personal User Authentication Method Based on Photographic Authentication", vol. 34, 2007, pp. 84-85 and 89.

English Language Machine Translation of Chinese Patent Publication No. CN101017524—10 pages.

English Language Machine Translation of Chinese Patent Publication No. CN101027699—8 pages.

\* cited by examiner

USER AUTHENTICATION

TECHNICAL FIELD

The present application generally relates to user authentication.

BACKGROUND ART

Mobile phones have become very common. Unfortunately, also the thefts of mobile phones have become more common. A thief may seek for use of the phone, to resell the phone for money and/or access to content within a phone. For the owner, the phones are personal items because of various sensitive private data they contain. Mobile phones are also being equipped with ever larger memories and often contain emails, short messages, calendar entries, phone books, call logs, photos and video clips taken by the phone, physical exercise diaries, shopping lists, and even online banking credentials.

SUMMARY

According to a first example aspect of the invention there is provided an apparatus comprising:
 a memory;
 a processor configured to cause receiving of a user determination of a pool of images and;
 the processor being further configured to form from the pool of images a set of images for user authentication;
 the processor being further configured to divide the set of images into two mutually exclusive subsets: a key image subset comprising images referred to as key images and a decoy image subset comprising images referred to as decoy images;
 the processor being further configured to produce an assortment of decoy images and key images;
 the processor being further configured to cause displaying of the assortment of decoy and key images;
 the processor being further configured to cause receiving of user identification of images held as key images; and
 the processor being further configured to verify whether the identification of key images matched with the key images selected by the processor.

The proportion of key images to the decoy images in the assortment may match with the proportion of key images in the key image subset with the decoy images in the decoy image subset.

The displaying of the assortment may comprise displaying two or more different groups of images. Each group of images may comprise identical number of key images. Alternatively, the distribution of key images between the groups of images may be random.

The processor may be configured to form the groups of images such that one key image may only appear in one group of images in the assortment. Alternatively, a common key image may appear in more than one group of images.

The processor may be configured to form the groups of images such that one decoy image may only appear in one group of images in the assortment. Alternatively, a common decoy image may appear in more than one group of images.

The key images and the decoy images may be presented in the assortment such that each image in the set of images appears with identical likelihood. The identical likelihood of appearance may hinder frequency based detection of key images.

The processor may be configured to cause providing the user with feedback of selection of an image in the form of chosen from a group consisting of: tactile response, sound, change in shape, highlight of the selected image, and signal provided by background illumination.

The processor may be configured to cause displaying the key images to the user.

The forming of the set of images may comprise rejecting images that are not likely subjectively distinctive over other images. The forming of the set may further comprise determining images with entropy level below a predetermined minimum level. The forming of the set may further or alternatively comprise determining images that resemble other images with a correlation that is higher than a predetermined maximum level.

The apparatus may be selected from a group consisting of: mobile communication device; personal digital assistant; music player; navigation apparatus; digital camera; camcorder; laptop computer; access control apparatus; and laundry machine.

According to a second example aspect of the invention there is provided a method comprising:
 receiving of a user determination of a pool of images and;
 forming from the pool of images a set of images for user authentication;
 dividing the set of images into two mutually exclusive subsets: a key image subset comprising images referred to as key images and a decoy image subset comprising images referred to as decoy images;
 producing an assortment of decoy images and key images;
 causing displaying of the assortment of decoy and key images;
 causing receiving of user identification of images held as key images; and
 verifying whether the identification of key images matched with the key images selected by the processor.

The proportion of key images to the decoy images in the assortment may match with the proportion of key images in the key image subset with the decoy images in the decoy image subset.

The displaying of the assortment may comprise displaying two or more different groups of images. Each group of images may comprise identical number of key images. Alternatively, the distribution of key images between the groups of images may be random.

The method may comprise forming the groups of images such that one key image may only appear in one group of images in the assortment. Alternatively, a common key image may appear in more than one group of images.

The method may comprise forming the groups of images such that one decoy image may only appear in one group of images in the assortment. Alternatively, a common decoy image may appear in more than one group of images.

The key images and the decoy images may be presented in the assortment such that each image in the set of images appears with identical likelihood. The identical likelihood of appearance may hinder frequency based detection of key images.

The method may further comprise causing providing the user with feedback of selection of an image in the form of chosen from a group consisting of: tactile response, sound, change in shape, highlight of the selected image, and signal provided by background illumination.

The forming of the set of images may comprise rejecting images that are not likely subjectively distinctive over other images. The forming of the set may further comprise determining images with entropy level below a predetermined minimum level. The forming of the set may further or alternatively comprise determining images that resemble other images with a correlation that is higher than a predetermined maximum level.

The method may further comprise causing displaying of the key images to the user.

The method may be performed in an apparatus selected from a group consisting of: mobile communication device; personal digital assistant; music player; navigation apparatus; digital camera; camcorder; laptop computer; access control apparatus; and laundry machine.

According to a third example aspect of the invention there is provided a computer executable program comprising computer executable program code, which when executed by a computer, causes the computer to cause an apparatus to perform any method according the second example aspect.

The computer program may be stored in a memory medium. The memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
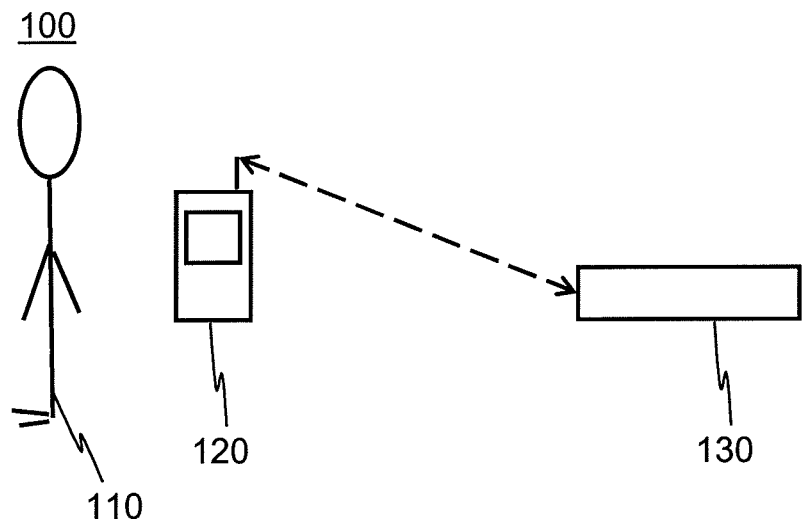
FIG. 1 shows a schematic drawing of a system according to a first example embodiment of the invention.

FIG. 1 shows a schematic drawing of a system 100 according to a first example embodiment of the invention. The system 100 comprises a user 110, an apparatus 120, and an external image repository 130 such as a home computer or network based backup server storing images possessed by the user 110. The images may be, for instance, photograph images taken by the user. User access to the apparatus 120 is controlled by the apparatus 120 in accordance with an example embodiment of the invention by receiving of a user determination of a pool of images, forming from the pool of images a set of images for user authentication, dividing the set of images into two mutually exclusive subsets: a key image subset comprising images referred to as key images and a decoy image subset comprising images referred to as decoy images; displaying the key images to the user 110, producing an assortment of decoy images and key images, displaying the assortment of decoy and key images, receiving identification of images held as key images; and verifying whether the identification of key images matched with the key images selected by the processor.

Figure 2:
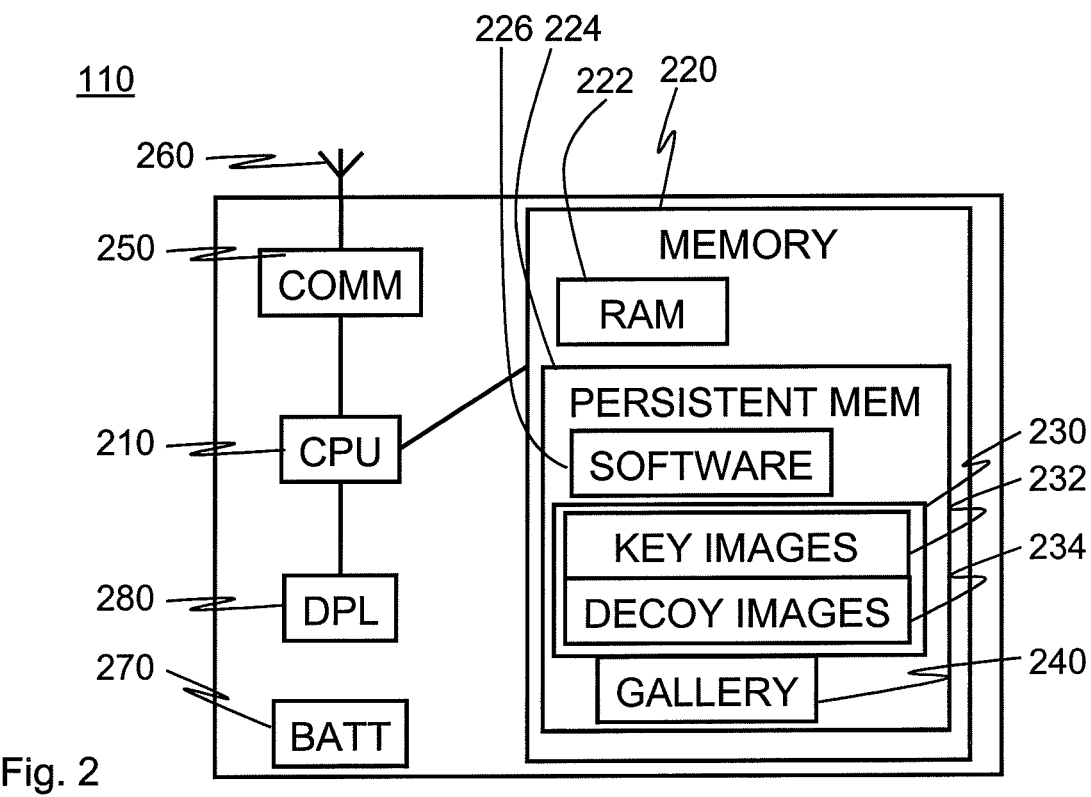
FIG. 2 shows a block diagram of an apparatus according to a second example embodiment of the invention.

FIG. 2 shows a block diagram of an apparatus 120 according to a second example embodiment of the invention that is also applicable with the first example embodiment. FIG. 2 also depicts blocks that are not necessarily present in some other embodiments of the invention. Hence, alike the whole description, the description of FIG. 2 is also to be understood as description of some example structures that may be omitted, replaced by other structures or supplemented by structures that are not expressly described in this context. The apparatus 120 comprises a main processor 210 in general control of different functions of the apparatus 120. Moreover, the apparatus 120 comprises a memory 220 with a work memory 222 and a non-volatile memory 224 that may store, among others, software or operating instructions 224, graphical authentication data 230 that comprises key images 232 and decoy images 234, and user media gallery 240. For communications, the apparatus 120 comprises a communication unit 250 and an antenna 260. A battery 270 may be provided for mobile operation. For use as a viewfinder and/or for displaying instructions and/or presenting different prompts for a user 110, the apparatus 110 may comprise a display 280.

In a third example embodiment of the invention applicable with the first and second example embodiments, the main processor 210 comprises, for instance, one or more master control processor, central processing unit, and/or digital signal processor. Moreover, in a fourth example embodiment of the invention applicable with any of the first to third example embodiments, the main processor 210 and the camera processor are integrally formed while presented as logically separate blocks in FIG. 2.

In a fifth example embodiment of the invention applicable with any of the first to fourth example embodiments, the memory is partly or entirely secured. For instance, the memory may comprise a trusted platform module (TPM) configured to secure secrecy of data.

The work memory 222 may comprise, for instance, random access memory, video random access memory or dynamic random access memory.

The non-volatile memory 224 may comprise flash-ram, electronically erasable read only memory, hard disk, hard disk array, optical storage, memory stick, memory card and/or magnetic memory.

The software 224 may comprise operating system, device drivers, program libraries, program interpreters, interpreting software platforms, binary applications, scripts, applets, macros and/or applications.

In a sixth example embodiment of the invention applicable with any of the first to fifth example embodiments, the apparatus 120 is selected from a group consisting of: mobile communication device; personal digital assistant; music player; navigation apparatus; digital camera; camcorder; laptop computer; access control apparatus; and laundry machine.

Figure 3:
FIG. 3 shows an assortment of authentication images according to a seventh example embodiment of the invention.

FIG. 3 shows an assortment of authentication images according to a seventh example embodiment of the invention applicable with any of the first to sixth example embodiments. It is appreciated that the assortment typically comprises a number of different groups of authentication images, but it suffices to show in FIG. 3 only one such group to describe this example embodiment.

FIG. 3 shows a grid 300 of authentication images according to an eighth example embodiment of the invention applicable with any of the first to seventh example embodiment. The grid generally comprises N rows and M columns, where N ranges between 2 and 10 and M ranges between 2 and 10. Grids dimensioned as 3×3 or 3×4 may directly mapped to normal keypad of a mobile phone, but of course larger grids accommodate more authentication images. The grid 300 of FIG. 3 is a 3×3 grid with rows R1 to R3 and columns C1 to C3. According to a ninth example embodiment of the invention applicable with any of the first to eighth example embodiment, the number of rows and columns is so determined that the individual images on the display of the apparatus 120 are distinguishable from one another by the user 110.

Some of the authentication images shown in the grid 300 are key images while the others are decoy images. The user 110 knows by heart the key images. According to a tenth example embodiment of the invention applicable with any of the first to ninth example embodiment, to authenticate herself to the apparatus 120, the user 110 identifies to the apparatus 120 the images that she considers as key images.

Let us assume that in grid 300, the image in the center is a key image. Thus, the user 110 points out that image R2C2 to the apparatus 120 (e.g. by touching the image if a touch screen is used or by tapping a corresponding key on the keypad). After the user 110 has pointed out the key image(s), the user 110 confirms that the key image identification for shown grid is complete and the apparatus 120 can proceed to show further grids or to check whether given identification(s) and the key images match. Alternatively to waiting for a user 110 to enter a confirmation when the entry of key image identification is complete, the apparatus 120 may be configured to input a number of identifications corresponding to the number of key images and automatically proceed when all identifications have been provided by the user 110.

Figure 4:
FIG. 4 shows an assortment of authentication images according to an eleventh example embodiment of the invention.

FIG. 4 shows an assortment of authentication images according to an eleventh example embodiment of the invention applicable with any of the first to tenth example embodiment, FIG. 4 differs from FIG. 3 in that in FIG. 4, same image may appear in more than one cell of the grid 300. In this example, it is assumed that two cells (C1R1 and C2R2) of the grid 300 share a common key image and two cells (C3R1 and C3R3) share a common decoy image. Of course, the doubled image need not be a key image. FIG. 4 merely illustrates an example in which each authentication image is randomly selected without regard to images used elsewhere in the assortment of authentication images.

In the example embodiment illustrated by FIG. 3, each authentication image appears only once so that even if the assortment is distributed on more than one different page or group of images, no two groups shares a common image, whether key image or decoy image.

In the eleventh example embodiment illustrated by FIG. 4, instead, a common image may appear twice in one group and/or a common image may appear in two or more groups of images. Operation according to some example embodiments of the invention will next be described in connection with FIG. 5.

Figure 5:
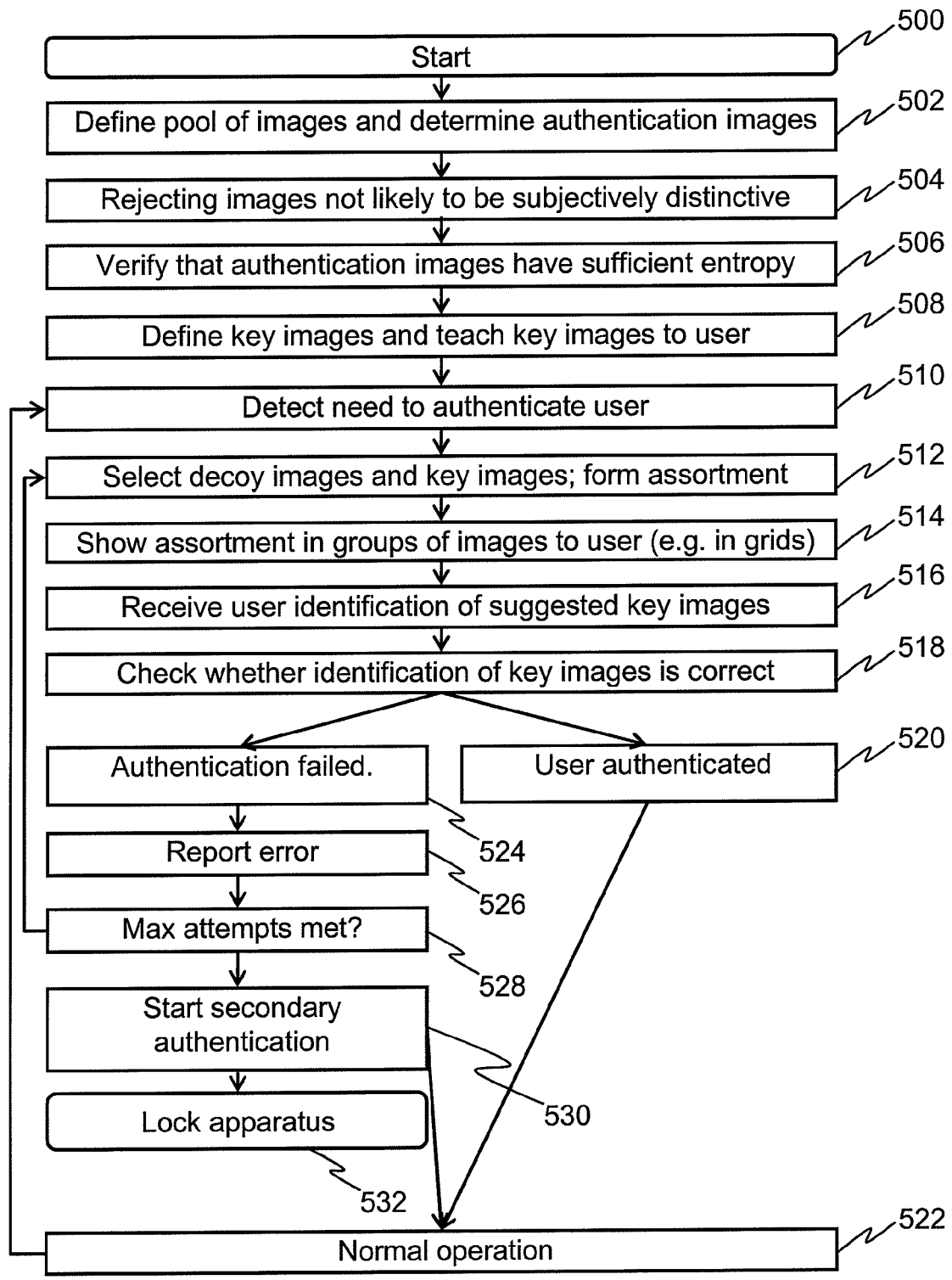
FIG. 5 shows a flow chart illustrating a process according to a twelfth example embodiment of the invention.

FIG. 5 shows a flow chart according to a twelfth example embodiment of the invention applicable with any of the first to eleventh example embodiment illustrating a process according to an example embodiment of the invention. The process starts from block 500 in which the apparatus 120 is running and an authentication is being taken to use. In step 502, a pool of images is defined by the user and authentication images are determined from the pool. The authentication images may also be referred to as a set of images for user authentication. That the user defines the pool of images may be beneficial for recognizing the authentication images as the images may then be associated with people and places that are familiar to the user. For privacy reasons, the user may, for instance, only select images that she is happy to let others see.

According to a thirteenth example embodiment of the invention applicable with any of the first to twelfth example embodiment, the process involves computationally rejecting images that are not likely subjectively distinctive over other images, 504. This rejecting may be based on determining images that resemble other images with a correlation that is higher than a predetermined maximum level. In an example embodiment of the invention, Daly's Visible Differences (VDP) predictor is used to estimate whether an image is likely too similar with another image.

According to a fourteenth example embodiment of the invention applicable with any of the first to thirteenth example embodiment, the determining of the authentication images may further comprise rejecting images with entropy level below a predetermined minimum level, 506. In one example embodiment of the invention, canny edge detection is used to identify the proportion of each image taken up with edges. If this measure falls below a given threshold, the entropy is deemed to be insufficient for the image in question likely possessing sufficient subjective distinctiveness.

According to a fifteenth example embodiment of the invention applicable with any of the first to fourteenth example embodiment, rejected images are replaced by other images of the image pool, after testing such replacement images in a fashion similar to that described in connection with steps 502 to 506. The process of selecting authentication images may be substantially automatic so as to avoid user bias in selecting key images. According to a sixteenth example embodiment of the invention applicable with any of the first to fifteenth example embodiment, after the authentication images are selected, a key image subset is formed and the key images are taught to the user, 508. The number of decoy images may be at least 8 times the number of key images, e.g. 8, 9 or 12, in order to counter intersection attacks. According to a seventeenth example embodiment of the invention applicable with any of the first to sixteenth example embodiment, the teaching of the key images comprises showing the key images to the user 110 and allowing the user 110 to rehearse selecting the key images from among remaining authentication images (wherein the remaining images form a decoy image set). The teaching may also be staged so that first a part or all of the key images are taught to the user 110 and the user 110 is also allowed to later learn the key images to refresh and maintain knowledge of the key images.

The stage in which the key images are shown to the user 110 is sensitive in terms of security. Normal users 110 would also understand the need to perform this step in privacy such that the key images are not exposed to a shoulder attack at this stage, even if under normal use the apparatus 120 could also be seen by friends or colleagues of the user 110 and thus the apparatus 120 might become exposed to a shoulder attack, i.e. potentially malicious people seeing some authentication images over the shoulder of the user 110. Normal authentications are to some extent protected against shoulder attacks by dimensioning the total number of authentication images and the number of authentication images in the assortment such that an attacker would not gain sufficient likelihood of success even if she were able to identify all the key images.

Steps 500 to 508 in FIG. 5 prepare the apparatus 120 to a state in which the apparatus 120 is ready to authenticate the user 110 with the authentication images. According to an eighteenth example embodiment of the invention applicable with any of the first to seventeenth example embodiment, the apparatus 120 then, at some point of time, detects 510 a need to authenticate the user 110. In response, the apparatus 120 randomly selects decoy images and key images to an assortment for use to authenticate the user, 512. The selecting may apply any of the following principles:

one authentication image appears only once in the assortment;

any image in the assortment is selected independently of other images so that images may appear more than once;

the proportion of key image instances in the assortment matches with the proportion of key images in the authentication images such that the frequency of appearance of particular image would not indicate whether that image would more likely be a key image or decoy image.

According to a nineteenth example embodiment of the invention applicable with any of the first to eighteenth example embodiment, the apparatus 120 shows to the user 110 the assortment in one or more groups of images, 514. The user 110 then identifies to the apparatus 120 the images which she has found as key images, 516. According to a twentieth example embodiment of the invention applicable with any of the first to nineteenth example embodiment, the user 110 is provided with feedback to assure the user 110 of successful selection. The feedback may be in the form of chosen from a group consisting of: tactile response, sound, change in shape, highlight of the selected image, and signal provided by background illumination.

In a twenty-first example embodiment of the invention applicable with any of the first to twentieth example embodiment, the assortment is shown by the apparatus 120 in groups of one image i.e. image by image. In this embodiment, the user is informed of an associated identifier for each image when shown to the user. The user then provides the identifiers to the apparatus 120. The identifiers may be provided while the images are being identified. In a twenty-second example embodiment applicable with any of the first to twenty-first example embodiment, the apparatus 120 only accepts the identifiers after presenting all of the authentication images of the assortment so as to prevent a shoulder attacker from determining the key images from the timing of identifier entry.

The showing of the images one by one takes place in a twenty-third example embodiment applicable with any of the first to eighteenth or twentieth to twenty-second example embodiment by displaying the images as a moving chain or as a drum wherein approaching images are shown as smaller images and presently shown image is displayed as a larger image together with the identifier.

According to a twenty-fourth example embodiment of the invention applicable with any of the first to twenty-third example embodiment, the identifier is formed as a pair of key legends so as to allow a user to memorize the identifiers for the time when the assortment is being displayed and then enter the identifiers by using keys according to the key legends. For instance, in ITU-T keypad of mobile phones, there are typically printed numbers 0 to 9 and subsets of alphabets "abc", "der, "ghi", jkl", "mno", "pqrs", "tuv", "wxyz". The first alphabet of each subset may be used as a part of a legend pair. For instance, one legend may be expressed as "m2" indicative of user having to first apply key 6 (for "m") and then key 2.

According to a twenty-fifth example embodiment of the invention applicable with any of the first to twenty-fourth example embodiment, the apparatus 120 then checks whether the user 110 identified key images match with the key images in the assortment, 518. If yes, the user 110 is authenticated 520 and normal operation follows 522. If no, the authentication failure is determined 524, according to a twenty-sixth example embodiment of the invention applicable with any of the first to twenty-fifth example embodiment, a report of the authentication error is produced 526 to the user 110 and the apparatus 120 checks 528 whether a maximum number of attempts has been made already. If there are no more attempts left or if there is no limit for the number of attempts but simply a delay is incurred to mitigate brute force attacks, the process resumes to step 512. Otherwise, secondary authentication may be started 530 to verify whether the user 110 has authentication to use the apparatus 120 or whether the apparatus 120 should be finally locked 532. However, if the secondary authentication succeeds, the process jumps to step 522 for normal operation. At this stage, according to a twenty-seventh example embodiment of the invention applicable with any of the first to twenty-sixth example embodiment, the user is provided with an option to study the key images again and/or to cause regeneration of the authentication keys starting from step 502.

According to a twenty-eighth example embodiment of the invention applicable with any of the first to twenty-seventh example embodiment, the apparatus changes the appearance of the images identified by the user 110 when the user has provided the respective identification. The change of appearance may be temporary and/or persistent. The change may involve, for instance, short flash of brightness of the image, concealing of the identified image, replacement of the identified image with another image, or changing the identified image more dim or blurred.

In a twenty-ninth example embodiment of the invention applicable with any of the first to twenty-eighth example embodiment, correction of an erroneous identification is provided by interpreting subsequent identification of a given image as reversal of preceding identification of that image.

In this document, identification of an image has been used as a shortcut for referring to the identification of an image instance in a particular cell of the grid. Namely, it is understood that one image may reside in more than one cell. However, even in that case, some example embodiments automatically select each instance of an image when one cell containing that image has been identified.

In a thirtieth example embodiment of the invention applicable with any of the first to twenty-ninth example embodiment, the key images are assigned a particular order. In this case, when more than one key image is displayed simultaneously in an assortment, the user shall identify the key images according to the defined order in order to authenticate herself. The order of the key images may be taught to the user by teaching the key images in that order so that the user 110 will learn the order of the key images on learning the key images.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. An apparatus comprising:
a processor and a memory including computer program code, the memory and the computer program code configured to, with the processor, cause an apparatus to:
receive a user-defined pool of images;
form only from the user-defined pool of images a set of user-pooled images for user authentication;
divide the set of user-pooled images into two mutually exclusive subsets: a key user-pooled image subset comprising user-pooled images referred to as key user-pooled images and a decoy user-pooled image subset comprising images referred to as decoy user-pooled images;
perform user-education regarding said key user-pooled image subset resulting from said division and regarding said decoy user-pooled image subset resulting from said division, wherein there is display regarding the key user-pooled image subset resulting from said division and regarding the decoy user-pooled image subset resulting from said division;
produce an assortment of decoy user-pooled images and key user-pooled images;
cause displaying the assortment of decoy user-pooled images and key user-pooled images;
cause receiving user identification of user-pooled images held as key user-pooled images; and
verify whether the identification of key user-pooled images matched with the key user-pooled images selected by the processor.

2. The apparatus of claim 1, wherein the proportion of key images to the decoy images in the assortment matches with the proportion of key images in the key image subset with the decoy images in the decoy image subset.

3. The apparatus of claim 1, wherein the displaying of the assortment comprises displaying two or more different groups of images.

4. The apparatus of claim 3, wherein each group of images comprises identical number of key images.

5. The apparatus of claim 3, wherein the distribution of key images between the groups of images is random.

6. The apparatus of claim 3, wherein the processor is configured to form the groups of images such that one key image is only allowed to appear in one group of images in the assortment.

7. The apparatus of claim 3, wherein a common key image is allowed to appear in more than one group of images.

8. The apparatus of claim 6, wherein the processor is configured to form the groups of images such that one decoy image is only allowed to appear in one group of images in the assortment.

9. The apparatus of claim 7, wherein the processor is configured to form the groups of images such that a common decoy image is allowed to appear in more than one group of images.

10. The apparatus of claim 1, wherein the processor is configured to form the groups of images such that each image in the set of images appears with identical likelihood.

11. The apparatus of claim 1, wherein the processor is configured to cause displaying the key images to the user.

12. The apparatus of claim 1, wherein the forming of the set of images further comprises rejecting images that are not likely subjectively distinctive over other images.

13. The apparatus of claim 1, wherein the forming of the set further comprises determining images that resemble other images with a correlation that is higher than a predetermined maximum level.

14. The apparatus of claim 1, wherein the apparatus is selected from a group comprising: mobile communication device; personal digital assistant; music player; navigation apparatus; digital camera; camcorder; laptop computer; access control apparatus; and laundry machine.

15. A method comprising:
receiving a user-defined pool of images;
forming only from the user-defined pool of images a set of user-pooled images for user authentication;
dividing the set of user-pooled images into two mutually exclusive subsets: a key user-pooled image subset comprising user-pooled images referred to as key user-pooled images and a decoy user-pooled image subset comprising images referred to as decoy user-pooled images;
performing user-education regarding said key user-pooled image subset resulting from said division and regarding said decoy user-pooled image subset resulting from said division, wherein there is display regarding the key user-pooled image subset resulting from said division and regarding the decoy user-pooled image subset resulting from said division;
producing an assortment of decoy user-pooled images and key user-pooled images;
causing displaying of the assortment of decoy user-pooled images and key user-pooled images;
causing receiving of user identification of user-pooled images held as key user-pooled images; and
verifying whether the identification of key user-pooled images matched with the key user-pooled images selected by the processor.

16. The method of claim 15, wherein the proportion of key images to the decoy images in the assortment matches with the proportion of key images in the key image subset with the decoy images in the decoy image subset.

17. The method of claim 15, wherein the displaying of the assortment comprises displaying two or more different groups of images.

18. The method of claim 17, wherein each group of images comprises identical number of key images.

19. The method of claim 15, wherein the key images and the decoy images are presented in the assortment such that each image in the set of images appears with identical likelihood.

20. The method of claim 15, wherein the forming of the set of images comprises rejecting images that are not likely subjectively distinctive over other images.

* * * * *